J. A. PERKINS.
ROLLER BEARING CAGE.
APPLICATION FILED DEC. 21, 1908.
1,002,443.
Patented Sept. 5, 1911.
2 SHEETS—SHEET 1.
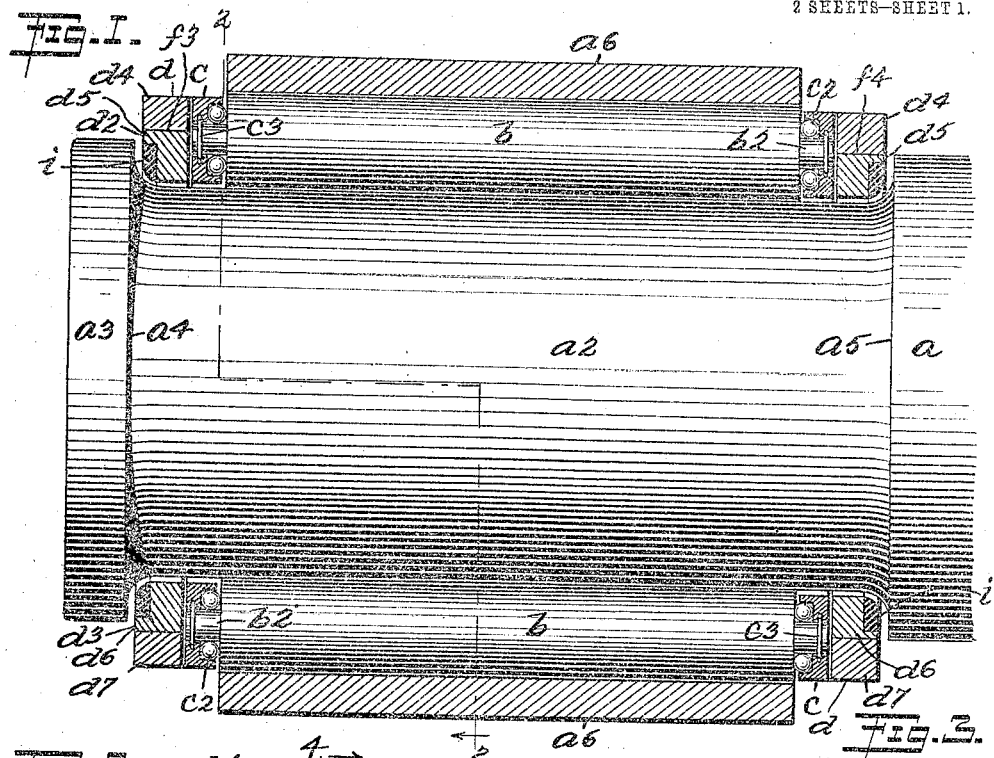
Attest:
Inventor:
Julius A. Perkins
by J. Chris Larsen
his Atty

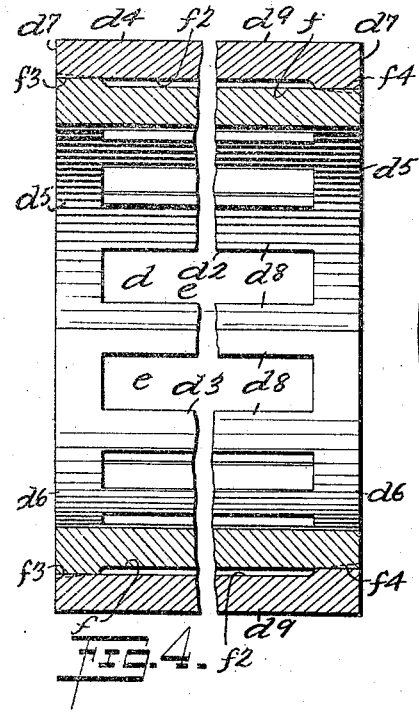
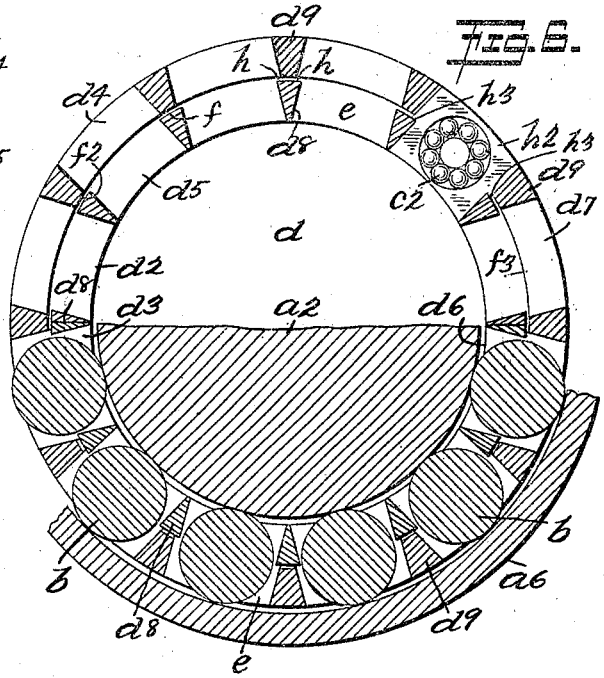
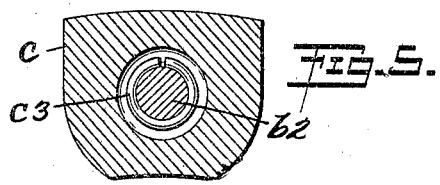

UNITED STATES PATENT OFFICE.

JULIUS A. PERKINS, OF OMAHA, NEBRASKA.

ROLLER-BEARING CAGE.

1,002,443.   Specification of Letters Patent.   Patented Sept. 5, 1911.

Application filed December 21, 1908. Serial No. 468,623.

*To all whom it may concern:*

Be it known that I, JULIUS A. PERKINS, a citizen of the United States of America, and residing at Omaha, in the county of Douglas and State of Nebraska, have invented certain new and useful Improvements in Roller-Bearing Cages, of which the following is a specification, such as will enable those skilled in the art to which it appertains to make and use the same.

This invention relates to bearings, particularly to roller bearings, and is an improvement over the forms shown and described in my applications for Letters Patent of the United States, filed October 28th, 1908, Serial No. 459,815, and November 3rd, 1908, Serial No. 460,833, and one object thereof is to provide a positive guide for the said rollers in their planetary movement about a shaft or axle, or journal thereof.

A further object is to provide a guiding cage for the said rollers which is composed of a plurality of parts adapted for ready assembling around a journal.

A further object is to so construct the parts of the cage whereby the same, together with the rollers, may be assembled upon a journal of a lesser diameter than the body or end of the shaft or axle of which said journal is a part and whereby when so assembled, the members of the cage are positively locked against individual movement and form a concrete unit.

A further object is to provide a cage composed of segmental members forming a circle and a circular member encompassing said segmental members to lock the same in position.

A further object is to provide means whereby the rollers and their connected parts form a lock for the said cage members when so assembled.

A further object is to provide means whereby said cage when assembled is held in a position substantially concentric with the journal.

A further object is to so construct the cage members whereby the assembling thereof must always be in a predetermined manner and a still further object is to provide means in connection with the inclosing members whereby said parts are locked together without the rollers being in position therein.

My invention is fully described in the following specification, of which the accompanying drawings form a part, in which the separate parts are designated by the same reference characters in each of the views, and in which:—

Figure 1 is a view of a car axle journal having my cage and roller bearings mounted thereon, partially in section; Fig. 2 is a section taken on the line 2—2 of Fig. 1; Fig. 3 is a side view of my cage; Fig. 4 is a section taken on the line 4—4 of Fig. 2; Fig. 5 is a view of a detail of the construction shown in the preceding figures; Fig. 6 is a view similar to Fig. 2 but showing a modification thereover.

In Figs. 1 to 5, inclusive, of the drawings, I have shown one form of embodiment of my invention and in which is illustrated an axle or shaft $a$, having a reduced journal $a^2$ and a collar $a^3$, forming shoulders $a^4$ and $a^5$, and around the said journal is a roller raceway $a^6$, between which and said journal are a plurality of solid rollers $b$. The rollers $b$ are provided, each, with reduced journals $b^2$, which are in detachable engagement, preferably, with blocks $c$, between which and said roller ends are interposed a plurality of balls $c^2$ or equivalents, whereby a non-frictional engagement is produced, said blocks being connected with the roller journals $b^2$ by means of annular wires $c^3$ engaging corresponding grooves in the said roller journals and in the said blocks, or in any other desired manner. The rollers $b$ and the connected blocks $c$ are carried by a cage $d$ which is composed of two segmental members $d^2$ and $d^3$, forming jointly a circle and around which is placed an integral circular member $d^4$ which holds the members $d^2$ and $d^3$ together, said members $d^2$, $d^3$ and $d^4$ being each composed of end plates $d^5$, $d^6$ and $d^7$, respectively, and connecting bars or ribs $d^8$ and $d^9$, the corresponding end plates and ribs being preferably integrally formed and the ribs $d^8$ and $d^9$ form spaces $e$ for the rollers $b$ and also form pockets for the blocks $c$, said blocks, in this form of construction, being inwardly curved at one side, as clearly shown in Figs. 2 and 5, and the ribs $d^8$ are correspondingly curved to prevent the said blocks from moving inwardly beyond a predetermined point.

As clearly shown in Fig. 4, the members $d^2$ and $d^3$ are reduced in diameter for a portion of the length of the cage, as shown at $f$, externally thereof, whereas the member $d^4$ is of an increased diameter for the greater portion of its length, as shown at $f^2$, the greater diameters of these members being approximately the same at one end of the cage and the lesser diameters the same at the other end of the cage, whereby a snug fit is produced, as shown at $f^3$ and $f^4$, and by means of this construction the cage members must be assembled in a predetermined manner, as will be seen, and, if desired, I may incline the joints of the cage members, as indicated in dotted lines, whereby the assembling of the cage members is more readily accomplished.

By reference to Fig. 1, it will be seen that the internal diameter of the cage member $d^4$ is greater than the diameter of the collar $a^3$ whereby, when the cage members $d^2$ and $d^3$ are placed in position about the journal $a^2$, the cage member $d^4$ may be passed over the said collar and over the cage members in order to lock the same against separation. When the cage members have been thus joined, the rollers $b$, with their connected blocks $c$, are placed in position in the roller spaces $e$, the length of the connected rollers and blocks being approximately the same as the length of the roller spaces and, when the rollers and blocks are in position, they serve to lock the cage member $d^4$ upon the cage members $d^2$ and $d^3$, preventing movement therebetween, and when the cage and bearings have been thus assembled upon the journal, said journal and bearings may be passed into the raceway $a^6$ or the said raceway may be slipped thereover, according to the conditions under which the bearings are employed.

In Fig. 6 is shown a slight modification of the construction hereinbefore described, in that the ribs $d^8$, instead of being curved, are tapered or inclined inwardly, the outer edges thereof being of greater width than the inner edges of the ribs $d^9$, thus producing shoulders $h$ therebetween, and forming roller spaces with parallel sides of two different diameters, and in this form of construction I provide similarly formed blocks $h^2$ having shoulders $h^3$ registering with the shoulders $h$ and thus limiting the inward movement of the said blocks in the spaces $e$.

In either of these forms it will be seen that the blocks $c$ or $h^2$ prevent rotary movement of the cage member $d^4$ upon the members $d^2$ and $d^3$ and, when the rollers and blocks are in position, lateral movement of the cage members is prevented but, as shown in Fig. 2, I may also employ a tongue $h^4$ upon one cage member engaging a corresponding groove in another member, thus preventing individual rotation and insuring a positive register of the ribs $d^8$ and $d^9$, but this detail is merely designed to assist in the assembling of the cage members.

In connection with the cage $d$ I also employ controllers $i$, composed of fiber or other anti-friction material, and adapted to take the impact of the cage against the shoulders $a^4$ and $a^5$, the material, size, or conformation of these controllers being capable of considerable modification, the object being to prevent the metal of the cage from striking the metal of the axle or shaft $a$.

It will thus be seen that I provide a cage composed of separable members adapted to be placed around a journal of a reduced diameter and another member adapted to be passed over the greater diameter of the shaft or axle and over the separable cage members, thus producing a cage the members of which form a unit when assembled and in which, when the rollers are in position, no movement is possible between the members thereof, and various changes in and modifications of the details shown and described may be made, within the spirit of my invention and without sacrificing its advantages.

Having fully described my invention, what I claim as new, and desire to secure by Letters Patent, is:—

1. In a bearing, a cage comprising separable segmental members and a solid annular member passed longitudinally over said segmental members for holding the same in position.

2. In a bearing, a cage comprising separable segmental members and an annular member about said segmental members for holding the same in position, each of said members consisting of end plates and ribs connecting the same.

3. In a bearing, a cage comprising separable segmental members and an annular member about said segmental members for holding the same in position, each of said members consisting of end plates and connecting ribs, and means for insuring the register of the ribs of said annular member with corresponding ribs of said segmental members.

4. In a bearing, a cage comprising separable segmental members and an annular member for holding the segmental members in position, said members consisting of end plates and connecting ribs, rollers mounted between said ribs, bearing blocks on the ends of said rollers and means, connected with said ribs, for limiting the movement of said blocks.

5. In a bearing, a cage comprising separable segmental members and an annular member inclosing the same, said segmental members when joined having different external diameters at the ends thereof and said annular member having corresponding, different, internal diameters at the ends thereof.

6. In a bearing, a cage comprising separable segmental members and an annular member inclosing the same, said members comprising end plates and connecting ribs, said ribs tapering inwardly whereby shoulders are formed between the ribs of said annular member and corresponding ribs of said segmental members.

7. In a bearing, a cage comprising separable segmental members and an annular inclosing member, said members consisting of end plates and connecting ribs, the ribs of said annular member registering with the ribs of said segmental members, a roller mounted between each pair of ribs and a bearing block at each end of each of said rollers and conforming to said registering ribs.

8. In a bearing, a cage comprising separable segmental members and an annular inclosing member, said members consisting of end plates and connecting ribs, said ribs being tapered to form shoulders at the intersection of the ribs of said annular member with the ribs of said segmental members, a roller mounted between each pair of ribs and a bearing block at each end of each of said rollers and provided with shoulders registering with the shoulders formed between said ribs.

9. In a bearing, a cage comprising separable segmental members and an annular inclosing member, rollers mounted in said cage and overlapping the joint of said segmental and inclosing members, serving to lock said cage members together.

10. In a bearing, a cage comprising separable segmental members and an annular inclosing member, rollers in said cage, and bearing blocks on said rollers, said rollers and blocks serving to lock said cage members together.

11. In a bearing, a shaft having a reduced journal, an outer bearing member, rollers interposed between said journal and outer bearing member, a cage for guiding said rollers, said cage comprising separable segmental members adapted to be placed about said journal and an annular member adapted to be passed longitudinally over said segmental members, the internal diameter of said annular member being greater than the diameter of said shaft and extending the full length of said separable members.

In testimony that I claim the foregoing as my invention I have signed my name in presence of the subscribing witnesses this 18th day of December, 1908.

JULIUS A. PERKINS.

Witnesses:
J. C. LARSEN,
GEORGE E. MINER.